May 12, 1970   H. CHAUMONT   3,511,631
TUYERE FOR THE GASEOUS FLOTATION OF SHEET GLASS
Filed Dec. 6, 1967   2 Sheets-Sheet 1

*INVENTOR.*
Henri Chaumont
BY
*Bauer and Seymour*
ATTORNEYS

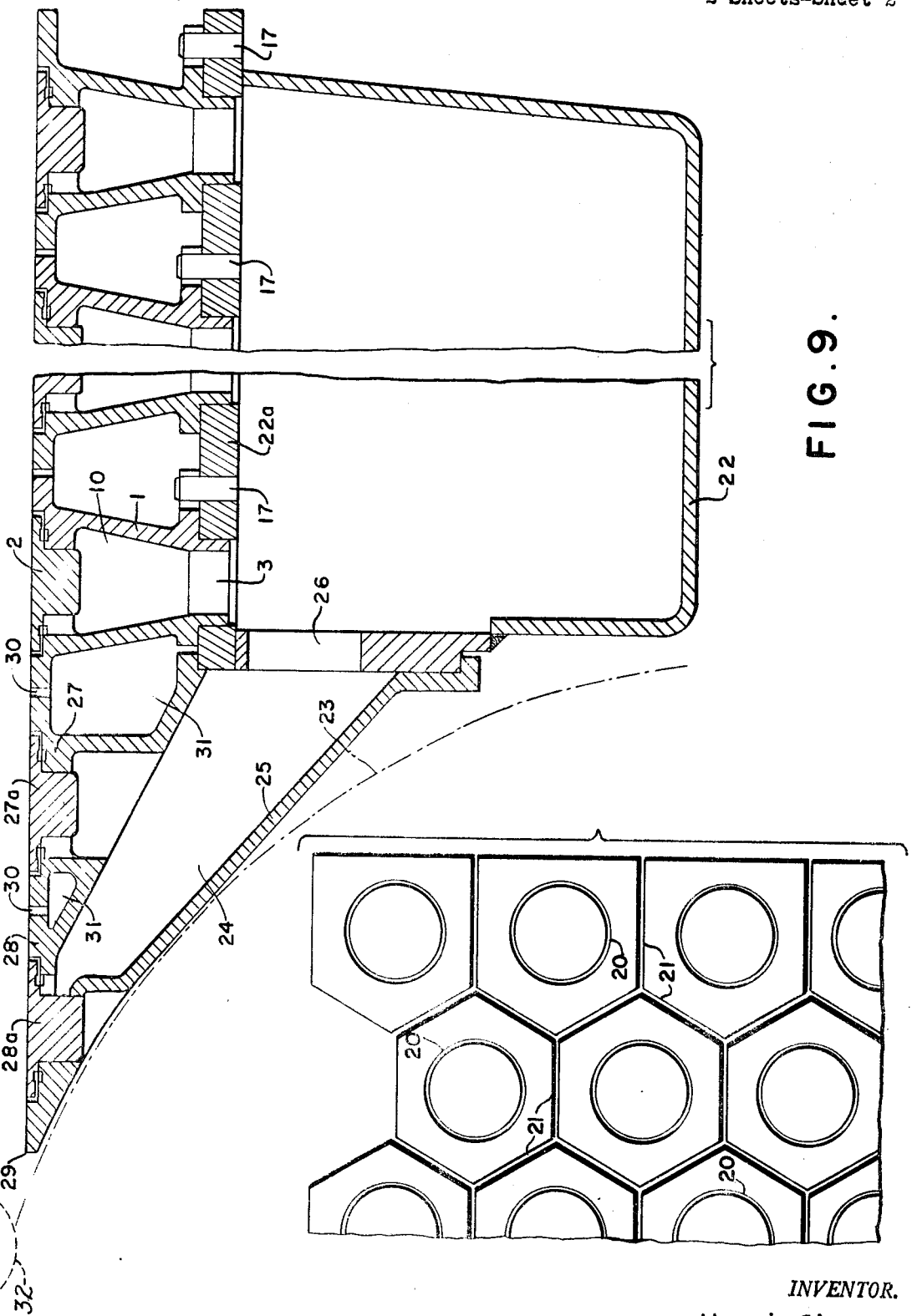

United States Patent Office 3,511,631
Patented May 12, 1970

3,511,631
TUYERE FOR THE GASEOUS FLOTATION OF SHEET GLASS
Henri Chaumont, Brussels, Belgium, assignor to Compagnie de Saint-Gobain, Neuilly-sur-Seine, France
Filed Dec. 6, 1967, Ser. No. 688,519
Claims priority, application France, Dec. 7, 1966, 86,484
Int. Cl. C03b 18/00
U.S. Cl. 65—182     11 Claims

ABSTRACT OF THE DISCLOSURE

Apparatus for supporting a sheet of material being processed, on a cushion of air, is of particular utility in the support of a hot, plastic sheet of glass while cooling the glass to essential solidity. A multiplicity of coplanar tuyeres distributed over an area, form upwardly-directed jets which support the sheet. The tuyeres contain horizontal and vertical passageways with the horizontal passageway being unobstructed and being longer radially than the length of the vertical passageway. A construction is provided wherein the horizontal passageway discharges into an expansion chamber of relatively large volume, so that air entering it loses its kinetic energy in large part, before passing upwardly to and through the vertical passageway. A structure is provided whereby one end of the apparatus may be introduced into the space between forming rollers for the sheet, thereby avoiding or reducing the hiatus between the line where the sheet emerges from between rollers and the line where it becomes fully airborne.

---

This invention relates to means for forming a gas cushion support for sheet material while in plastic or deformable condition. While of general utility for supporting sheets of various materials, without danger of marring or distortion thereof, it is of particular utility in supporting a sheet or ribbon of hot plastic glass immediately upon its emergence from between its forming rollers, until it has traveled a sufficient distance to become cooled and hardened enough to be conveyed without distortion, bending or marring over and along conveyor means of conventional types such as rollers or belts.

It is known to support and transport material upon a cushion of gas such as air. Such means are of particular value where a sheet or ribbon under production is in plastic or deformable condition due to high temperature, such as sheet glass after rolling, drawing or tempering, or where polymerization of a sheet or ribbon of synthetic plastic has not been completed. In certain prior art apparatuses of the nature stated, attempts have been made to establish a gaseous support consisting of jets of gas which are essentially laminar. Further, much study has been made to provide means by which the gas forming the sustaining laminar jets is effectively and efficiently exhausted, for such evacuation of each increment of mass of the gas after it has exerted its lifting force upon the sheet, is absolutely essential. It is necessary, not only to obtain good equilibrium of the supported sheet over its plastic area, but also because essentially uniform pressure over each unit area of the sheet is necessary in order that deformation thereof may be avoided. This is of especial importance, for example, where a ribbon of glass at high temperature is being handled and transported. In one particular apparatus for the purpose aforesaid, it has been proposed to mount jet-forming tuyeres over and in communication with a pressure vessel or box within which supporting gas is maintained at a certain constant pressure. There are thus formed a large number of upwardly directed gas jets distributed over the area of support of the sheet. The gas is exhausted through spaces between the tuyeres or nozzles.

In one prior art installation each tuyere comprises a plane upper surface through which there is formed a circular or annular orifice, and through which air or other gas under pressure is forced and emerges upwardly to form a thin laminar jet.

One characteristic of those devices is that it is necessary to avoid a large loss of gas when a sheet passing over the assemblage of jets, did not fully cover all of them so that there is no obturation or obstruction to free flow of gas from these uncovered orifices. Furthermore it is necessary to restrict the flow from each orifice because, otherwise, the reactions in the supporting force applied to the sheet per unit of area thereof would be too slow and the elevation of the sheet over the assemblage of orifices less constant and uniform.

Actually it was necessary to give the tuyeres a relatively great height or vertical dimension, to thereby produce the necessary loss of pressure head in each tuyere, but this resulted in an undesirably large weight of the assembly and is particularly objectionable in those installations wherein the assembly must be continuously oscillated in a horizontal or essentially horizontal plane.

Furthermore it is very desirable for other reasons, to provide an apparatus of this type with a relatively small over-all vertical dimension. For example, where a ribbon of glass is being formed between rollers, it is imperative that the glass be supported on the gas cushion almost immediately upon its emergence from between the rollers, to thus prevent sagging and bending which will occur if there is an appreciable hiatus between the transverse line where the ribbon emerges from between the rollers, and the line where it becomes supported on the gas cushion. Obviously a device of relatively small over-all vertical dimension enables reduction of the hiatus to a minimum because it can be moved up closer within the space between the rollers.

It is therefore a chief object of the invention to provide a device of the nature stated, wherein the tuyeres are of relatively small or reduced over-all dimension, while providing for the desired loss of pressure head. This object is attained by making the passageway of each tuyere leading from the pressurized tank to ambient atmosphere, in a first horizontally disposed portion and a second vertically disposed portion. Advantageously the horizontal portion is made the longer of the two, for thereby the over-all vertical dimension of each tuyere is kept at a minimum. It is equally desirable in order to reduce to a minimum the over-all vertical dimension of the tuyeres, that the horizontal portion of the passageway be disposed closely adjacent the exterior surface of the tuyere.

Prior art nozzles or tuyeres usually have a plane upper horizontal surface through which opens an orifice constituting a closed geometrical figure such as a circle. This creates a zone above the plane surface, delimited by the outline of the orifice, wherein the pressure of the gas is essentially constant and the gas has relatively little movement. On the other hand, the pressure diminishes rapidly in the space above the surface but outside of the area delimited by the orifice, in a path leading to the corresponding adjacent exhaust orifice. This exhaust orifice may be in the form of a closed geometrical figure, or otherwise. Further, in the prior art devices the pressure passes to a maximum above the orifice of the tuyere.

If the flow of sustaining gas passing upwardly from each tuyere is at a relatively low rate the maximum pressure above the orifice is not sharply accentuated and diminishes slowly at the areas above the surface outside the space delimited by the orifices, in the direction of the corresponding exhaust orifices. Thus there is obtained finally an area above the surface conjointly defined by the upper ends of the tuyeres, wherein the pressure of the gas over those portions delimited by the orifices, is about the same as the pressure over the remaining portions of the area. In other words, there is obtained a generally planar area above the plane defined by the tuyeres and essentially parallel therewith, wherein the pressure is generally constant and uniform.

Nevertheless, if the flow of gas is increased, the total pressure existing directly over the supporting jets increases rapidly so that the distribution of pressures over the aforesaid area is no longer constant and uniform but, to the contrary, is variable from place to place and there is a sharp rise in the pressure at a point above the supporting jets. On the other hand it is important to employ a relatively great rate of flow of gas because the specific heat thereof is relatively low and thus large volumes of gas are required to absorb heat at a rate sufficient to rapidly lower its temperature to the point where it is essentially solid.

Such, for example, is the case wherein a plastic ribbon of glass emerges from between its forming rollers, because it is there necessary to cool the emerging glass rapidly in order to impart mechanical strength to it. The same requirements are present with respect to tempering of the glass.

Another object is to provide a tuyere which effectively smooths the pressure curve and eliminates or reduces the sharp rise in pressure aforesaid. This object is attained by providing an enlarged channel at the place where the horizontal portion of the air passageway joins the vertical portion thereof. The gas discharges into this enlarged channel at high speed from the horizontal portion of the passageway, and therein becomes turbulent and gives up a large portion of its kinetic energy by entering the vertical or jet-forming orifice.

Although the curved form of the passageway aids, it is chiefly the aforesaid enlarged channel interposed in the passageway, that is important in effecting the aforesaid smoothing of the pressure curve to eliminate the well-defined point of high or maximum pressure. The result is very important because otherwise, these points of high pressure, effective upon the softened plastic sheet, cause local and highly objectionable deformations thereof. An advantageous way of obtaining it is to insert a chamber through which the gas passes before entering the vertical portion.

The invention will become clear from a study of the following detailed description, in connection with the accompanying drawing wherein are shown several forms all of which are of particular utility in supporting a ribbon of hot glass as it emerges from between its forming rollers.

In the drawing:

FIG. 8 is a plan view showing a grouping of a number of tuyeres of hexagonal and pentagonal shape; and FIG. 9 shows in vertical section the mounting of a number of tuyeres at the location where the sheet material emerges from between its forming rollers.

Figure 1:
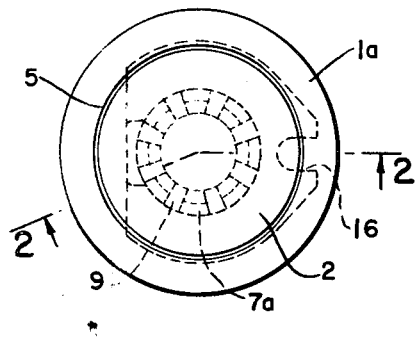
FIG. 1 shows in top plan a form of the invention wherein the top surface of the tuyere is circular and planar.
Figure 2:
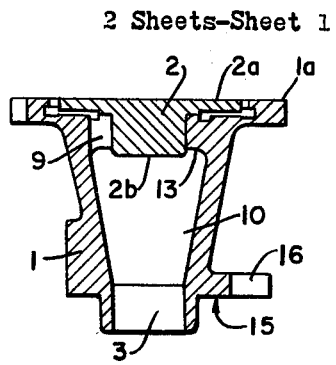
FIG. 2 is a section taken in planes indicated by lines II—II, FIG. 1.

In FIGS. 1 and 2, body 1 is hollow and of generally inverted frusto-conical form, terminating at its lower end in an integral cylindrical collar portion 3, and at its upper end in a flanged rim 1a which, in this model, has a circular periphery. At its lower end each of the collars 3 is in airtight relation with a corresponding-shaped aperture in the top wall of a large pressure chamber such as 22, FIG. 9, from which air under essentially constant pressure enters the collar and passes upwardly through chamber 10.

Figure 3:
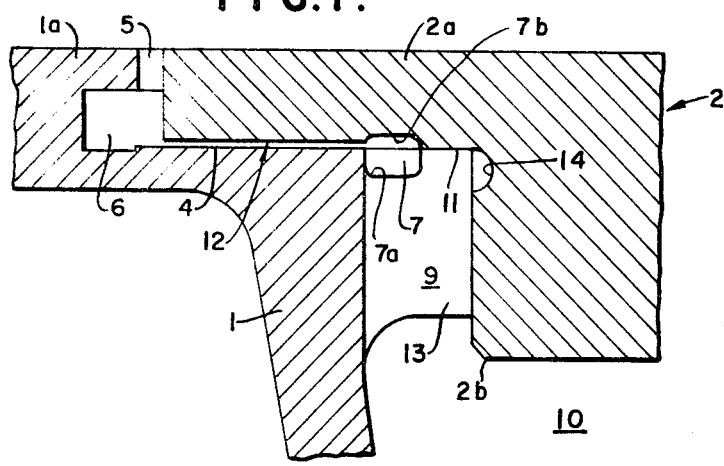
FIG. 3 is a sectional view to an enlarged scale, showing details of construction of the species of FIG. 1 and 2.

At its top, body 1 is particularly obturated by a plug 2. Referring more particularly to FIG. 3, body 1 is provided with a number, eight in the model shown, of radially-inwardly-extending integral projections such as 13, FIGS. 2 and 3. The inner ends of these projections make snug contact with the walls of downward extension 2b forming a central portion of the plug, and thus act to positively locate the plug in and with respect to the central axis of body 1. Thus, each consecutive pair of projections form between them a passageway 9, totaling eight in number and through which gas may pass upwardly from chamber 10.

At their radially inward ends the upper surfaces of projections 13 conjointly define a plane which is normal to the central axis of body 1. A thin layer of material is removed from the lower surface of flange 2a confronting the corresponding or subjacent upper surface of flange 1a, to thereby form a radially and circumferentially extending passageway 4, extending through 360° about the aforesaid central axis of body 1. Of course it is possible alternatively, to form this passageway 4 by removing material from the upper surface of flange 1a.

Continuing reference to FIG. 3, the plane of contact between flanges 1a and 2a is indicated at 11. Rim 1a is undercut as at 6, to form an expansion chamber of large cross sectional area in planes through the central axis of the body, with respect to the corresponding area of vertical passageway or orifice 5. As shown, this chamber is in communication with passageway 4 and is supplied with air therefrom.

The radially outward portions of projections 13, that is, those portions contiguous to the wall of body 1, are relieved or cut away as at 7a. Likewise the superjacent lower surface of rim 2a may be relieved as at 7b. These two relieved portions thus conjointly define a circular horizontal channel 7 to which air is fed from passageway 9. To assure a precise fit and to provide for further free communication between passageways 9, the metal of plug 2 may be removed as at 14, FIG. 3.

Referring to FIGS. 1 and 2, the lower end of the conical portion of body 1, at its junction with collar 3, is externally flanged to form a downwardly-facing surface 15 in a plane normal to the central vertical axis of the body. This surface rests upon the upper surface of plate 22a forming the top of pressure box 22, FIG. 9, and thus assures that the upper surface of all plugs 2 and rim portions 1a are horizontally coplanar. In addition the aforesaid rim has a radial enlargement, slotted as at 16. As is clear from FIG. 9 each slot receives with a snug fit a respective one of pins 17 secured in top 22a. Thus each tuyere assembly is held in proper rotational position with respect to box 22 and with respect to each other, to thus form a regular geometrical pattern such as that shown in FIG. 8.

In operation, air passes upwardly under pressure from box 22, through each collar 3, into chamber 10 thence upwardly into passageways 9 and channel 7. From this channel air flows radially outwardly in all directions into chamber 6 where it expands and loses much of its kinetic energy, and finally emerges upwardly through relatively large orifices 5, as a smooth laminar annular jet.

Figure 4:
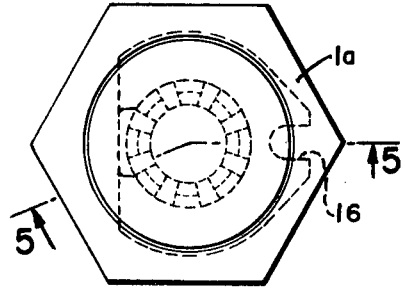
FIG. 4 is a plan view of a plug or tuyere having hexagonal form.
Figure 5:
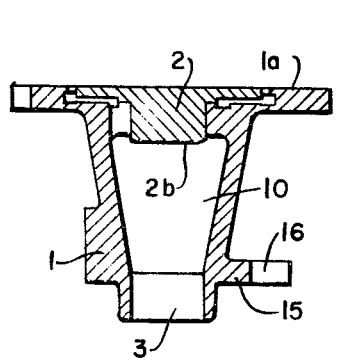
FIG. 5 is a section taken in planes identified by line V—V, FIG. 4.

The construction shown upon FIGS. 4 and 5 is like that described in connection with FIGS. 1, 2 and 3, and need not be redescribed. The difference is that, as shown by FIG. 4, rim 1a is a regular hexagon.

Figure 6:
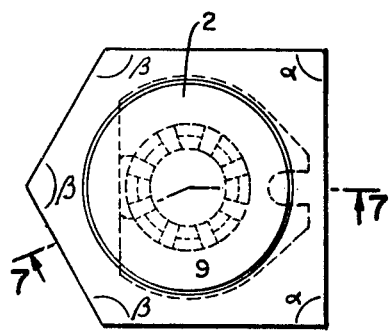
FIG. 6 is a plan view of a form of tuyere having a plane surface of pentagonal form.
Figure 7:
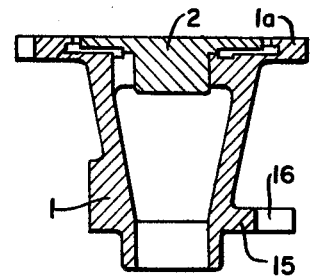
FIG. 7 is a corresponding section in a plane identified by line VII—VII, FIG. 6.

The construction shown upon FIGS. 6 and 7 is also like that previously described in connection with FIGS.

1, 2 and 3, except that rim 1a is pentagonal wherein, referring to FIG. 6, angles α are 90° and angles β are 120° each. Tuyeres such as those shown upon FIGS. 6 and 7 are emplaced as outer rows of the assemblage so that their edges between the 90° angles are in alignment and define straight lines forming the borders of the group or multiplicity of tuyeres.

Where the assemblage is composed of tuyeres having circular rims, each contiguous set of three define a generally triangular aperture with curved sides and through which gas from the adjacent orifices 5 is exhausted downwardly between the tuyeres. Where these rims are hexagonal they are so dimensioned as shown upon FIG. 8, to conjointly define slots 21 through which gas is evacuated after emerging from orifices 20 and exerting lifting force upon the superposed sheet.

As previously noted, it is highly advantageous to support the sheet immediately upon its emergence from between its forming rollers. The construction shown upon FIG. 9 provides such support and is of particular value in connection with the minimal vertical dimension of the tuyere forming a part of the invention. In FIG. 9 the lower roller 23 and the upper roller 32 are identified.

Pressure box 22 has an orifice 26 in its wall facing roller 23. A hollow extension 28 is secured to this wall to encompass orifice 26, and includes a bottom wall 25 sloping upwardly and outwardly to form at 29 a lip which projects into the space between the upper forming roller 32 and lower roller 23. The lip extends along a line parallel with and closely adjacent the lines of closest approach of the rollers.

The upper surface of extension 28 is plane and coplanar with the upper surface conjointly defined by the tuyeres directly supported upon upper wall 22a. This upper surface is formed with a regular pattern of openings each of which is provided with circumferentially spaced, radially and inwardly extending projections like 13, FIGS. 2 and 3, and each of which receives a plug such as 27a, 28a, both of which are essentially of the same construction, shape and form as plug 2, FIG. 2. These plugs have their peripheries in spaced relation with the edges of the respective openings, to form jet orifices, as indicated at 20, FIG. 8. The extension is also provided with exhaust conduits like that identified at 31, FIG. 9, and orifices 30, each opening through the top surface of extension 28 to provide for adequate downward exhaust of gas issuing from the contiguous tuyeres.

Having fully disclosed the invention, what I claim and desire to secure by Letters Patent is:

1. A tuyere to form one of a multiplicity of upwardly directed gas jets regularly distributed over an area to support thereon a sheet of material, out of contact with solid objects, comprising, a hollow body having a central, normally vertical axis and terminating at its upper end in an outwardly projecting first flange surmounted by an upstanding rim defining a vertical, inwardly facing wall, a plug comprising a radially and circumferentially extending second flange to fit within said wall with its periphery spaced therefrom to define a vertical passageway, and means supporting said flanges with their confronting surfaces slightly out of contact to define a narrow horizontal unobstructed passageway interconnecting the hollow interior of said body with said vertical passageway, an expansion chamber intermediate said horizontal passageway and said vertical passageway said horizontal passageway being longer radially of said axis, than the length dimension of said vertical passageway parallel with said axis.

2. The tuyere of claim 1, said rim being of regular geometrical form and concentric of said axis.

3. The tuyere of claim 1, the upper surfaces of said rim and second flange being flat and coplanar.

4. The tuyere of claim 1, said wall being undercut adjacent its base to define a peripheral closed chamber into which gas from said horizontal passageway discharges, before passing outwardly through said vertical passageway.

5. The tuyere of claim 1, said supporting means comprising a plurality of circumferentially-spaced projections integrally connected with and extending radially inwardly from the upper inner wall of said body, at least a portion of the upper surfaces of said projections being coplanar in a plane slightly above the upper surface of said first flange, said second flange resting upon and conjointly supported by said portions.

6. The tuyere of claim 5, the space between each contiguous pair of said projections forming a chamber, a portion of the upper surface of each said projection being removed to form a communication between contiguous chambers.

7. The tuyere of claim 6, said second flange having a groove passing above and in registration with each said removed portion of said projections.

8. The tuyere of claim 2, the outer periphery of said rim being pentagonal with two consecutive angles of 90° each, the remaining angles being 120° each.

9. Apparatus for supporting a sheet of material upon a cushion of gas in combination with a forming roller, comprising, a pressure box having a top wall and an end wall, there being a multiplicity of means defining apertures in and through said top wall, distributed over an area thereof, a multiplicity of tuyeres, means securing each said tuyere over and in fluid-tight relation with a respective one of said aperture means, each said tuyere forming an upwardly-directed jet in response to gas under pressure within said box, there also being means defining an opening through said end wall, a hollow closed extension secured over said opening in pressure-tight communication with the interior of said box and extending closely adjacent to and parallel with the plane determined by the elements of said roller, said hollow extension including (a) a bottom wall extending upwardly and outwardly from said end wall, (b) a planar upper wall meeting said bottom wall in an edge, and coplanar with the top surfaces of said tuyeres, and means defining jet-forming orifices in and through said upper wall, distributed over the area thereof.

10. The apparatus of claim 9, said upper wall being formed with means defining exhaust openings interspersed with and between at least some of said orifices therethrough, and conduit means connected with all said exhaust openings, to conduct away gas emerging from said orifices.

11. The apparatus of claim 9, in combination with a second roller spaced parallel and superposed above the first roller, the two rollers conjointly forming sheet material between them, said edge extending into the space between said rollers, closely adjacent to and parallel with the plane determined by the elements of said rollers at their closest approach, each to the other.

References Cited

UNITED STATES PATENTS 3,223,500  12/1965  Misson.
3,300,291  1/1967  Misson.

S. LEON BASHORE, Primary Examiner

E. R. FREEDMAN, Assistant Examiner

U.S. Cl. X.R.

65—25, 84, 95; 110—182.5; 122—6.6; 214—1